United States Patent
Brieden et al.

(10) Patent No.: US 7,237,681 B2
(45) Date of Patent: Jul. 3, 2007

(54) RING FILTER ELEMENT FOR A LIQUID FILTER

(75) Inventors: Thomas Brieden, Waiblingen (DE); Benoit Monzie, Stuttgart (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 324 days.

(21) Appl. No.: 10/506,313

(22) PCT Filed: Aug. 26, 2003

(86) PCT No.: PCT/DE03/02843

§ 371 (c)(1),
(2), (4) Date: Sep. 1, 2004

(87) PCT Pub. No.: WO2004/031542

PCT Pub. Date: Apr. 15, 2004

(65) Prior Publication Data

US 2005/0126964 A1    Jun. 16, 2005

(30) Foreign Application Priority Data

Oct. 1, 2002    (DE) ................................ 102 46 151

(51) Int. Cl.
  *B01D 35/14*    (2006.01)
(52) U.S. Cl. ................... 210/435; 210/437; 210/440; 210/443; 210/434; 210/450
(58) Field of Classification Search ............. 210/435, 210/437, 440, 443, 450, 248, 132, 445, 335, 210/434; B01D 35/14
See application file for complete search history.

(56) References Cited

U.S. PATENT DOCUMENTS

| | | | |
|---|---|---|---|
| 2,995,253 A * | 8/1961 | Belgarde et al. | ......... 210/323.2 |
| 4,094,791 A | 6/1978 | Conrad | |
| 5,603,829 A | 2/1997 | Baumann | |
| 6,672,288 B1 * | 1/2004 | Schelhas et al. | ............ 123/509 |
| 6,706,181 B1 | 3/2004 | Baumann et al. | |
| 6,709,588 B2 | 3/2004 | Pavlin et al. | |

FOREIGN PATENT DOCUMENTS

| | | |
|---|---|---|
| DE | 25 53 293 | 6/1977 |
| DE | 35 38 589 | 5/1987 |
| DE | 43 06 431 | 7/1994 |
| DE | 195 38 883 | 4/1997 |
| DE | 198 09 919 | 2/1999 |
| DE | 199 51 085 | 4/2001 |
| EP | 0 713 720 | 5/1996 |
| EP | 1 229 985 | 8/2002 |
| EP | 1 260 260 | 11/2002 |
| WO | WO 01 07141 | 2/2001 |

* cited by examiner

*Primary Examiner*—Krishnan S. Menon
*Assistant Examiner*—Benjamin Kurtz
(74) *Attorney, Agent, or Firm*—Collard & Roe, P.C.

(57) ABSTRACT

A ring filter element is provided for a liquid filter, especially for an oil filter for purifying lubricating oil, especially for an internal combustion engine of a motor vehicle. The ring filter element comprises a filter material which is arranged in an annular manner and at least one end disk comprising an outwardly protruding journal which is eccentrically arranged in relation to the longitudinal central axis of the ring filter element. The functionality of the ring filter element can be improved by providing a discharge channel which radially penetrates the journal and the associated end disk next to the filter material.

12 Claims, 2 Drawing Sheets

RING FILTER ELEMENT FOR A LIQUID FILTER

CROSS REFERENCE TO RELATED APPLICATIONS

Figure 1:
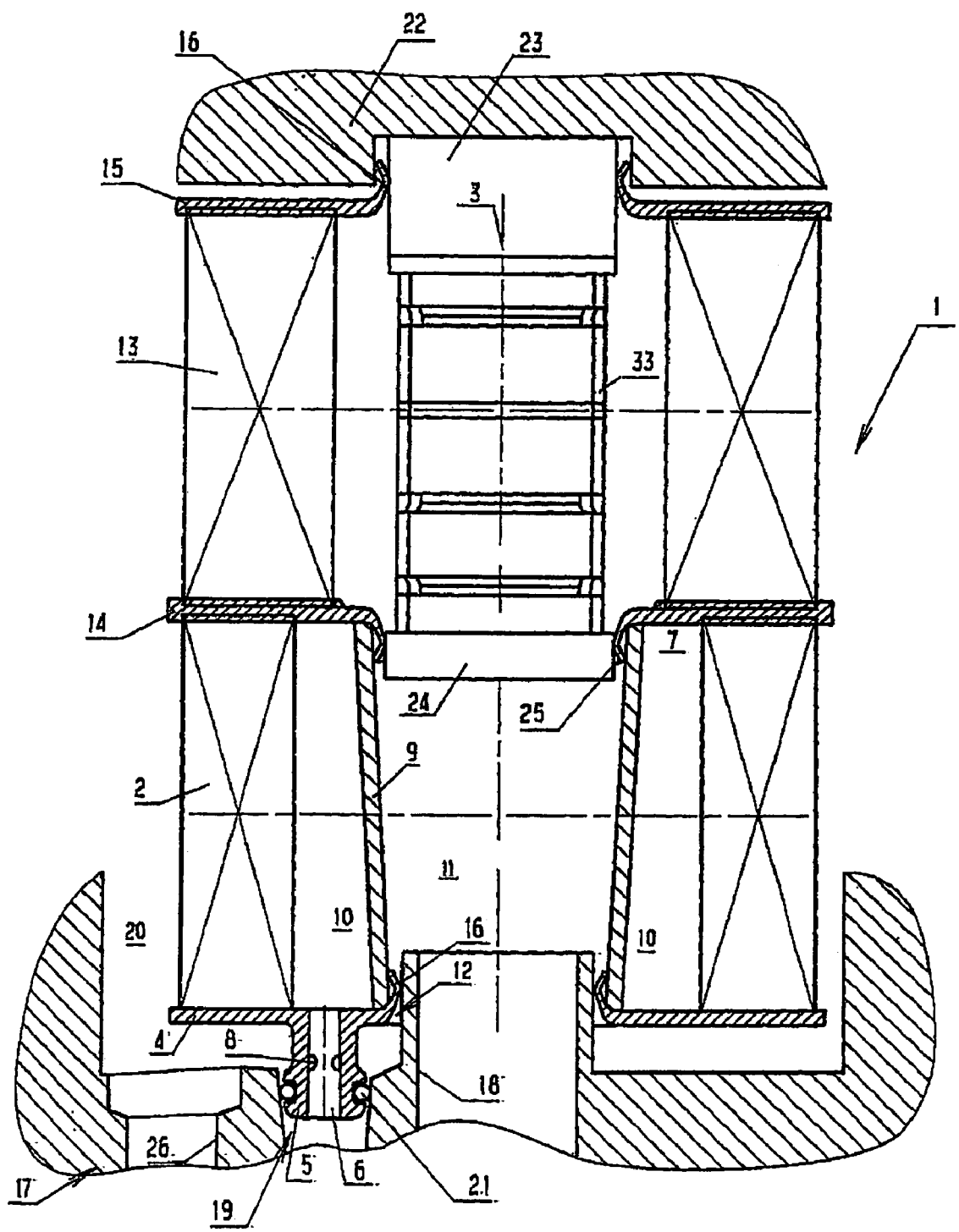

Applicants claim priority under 35 U.S.C. §119 of German Application No. 102 46 151.1 filed on Oct. 1, 2002. Applicants also claim priority under 35 U.S.C. §365 of PCT/DE2003/002843 filed on Aug. 26, 2003. The international application under PCT article 21(2) was not published in English.

The present invention relates to a ring filter element for a liquid filter, particularly for an oil filter for purifying lubricant oil, particularly for an internal combustion engine of a motor vehicle, having the features of the preamble of claim 1.

A ring filter element of this type is known, for example, from DE 199 51 085 A1 and has an annularly positioned filter material and at least one axial end disk, which has a journal positioned eccentrically in relation to the lengthwise central axis of the ring filter element and projecting axially outward. A ring filter element of this type is used in an essentially vertical filter housing, into which the ring filter element is axially insertable and/or from which the ring filter element is axially removable. When the ring filter element is inserted into the housing, the journal, which leads during insertion, penetrates into an emptying channel implemented on the floor of the filter housing. When the ring filter element is inserted, the emptying channel is tightly sealed by the journal inserted therein. The ring filter element is expediently axially fixed on a cover of the filter housing, but is mounted rotatably on this cover. When the cover is removed, the ring filter element is moved axially out of the filter housing, the journal simultaneously being pulled out of the emptying channel. The filter housing may thus empty through the emptying channel, typically even before the cover is completely removed. This construction has the significant advantage that contamination of the environment with the particular liquid during maintenance work may be avoided. Furthermore, liquid which has not yet been filtered is also prevented from reaching a clean-side discharge of the filter housing. The emptying channel typically leads to a storage reservoir. In an internal combustion engine, this storage reservoir is typically formed by an oil sump.

A device in which a ring filter element and a centrifuge are housed in a filter housing is known from DE 43 06 431 C2. In this case, the ring filter element is used as a main flow filter, while the centrifuge operates as a kind of secondary flow filter. The secondary flow filtered by the centrifuge flows on the clean side through an outlet of the filter housing into a collection container, preferably into the oil sump of the internal combustion engine equipped with the device. While the main flow filter filters the lubricant oil necessary for proper operation of the internal combustion engine comparatively coarsely, a relatively fine filter effect may be achieved with the aid of the secondary flow centrifuge.

The present invention is concerned with the object of specifying an improved embodiment for a ring filter element of the type cited at the beginning, which provides the ring filter element with increased functionality in particular.

This object is achieved according to the present invention by the object of the independent claim. Advantageous refinements are the object of the dependent claims.

The present invention is based on the general idea of integrating a discharge channel into the journal, through which, during operation of a filter equipped with the ring filter element according to the present invention, liquid from the clean side of the ring filter element, for example, reaches the particular channel into which the journal is inserted. In this way, liquid may be diverted in a targeted way into the channel which is closed by the journal in typical ring filter elements. This additional function is advantageous for specific applications.

An embodiment in which the ring filter element is implemented as a partial or secondary flow filter or includes such a filter is of special interest. The discharge channel may advantageously be dimensioned in regard to its flow resistance in such a way that a secondary flow flowing through the secondary flow filter is limited to a predetermined volume flow or is limited to a predetermined proportion of a total flow formed by the partial or secondary flow and a main flow. Due to the targeted dimensioning of the discharge channel, it fulfills an additional function in that it not only allows the diversion of a partial or secondary flow, but rather also limits its volume flow.

In a refinement, a throttle may be provided. Preferably, the discharge channel forms the throttle or the discharge channel includes or contains the throttle. The flow resistance of the discharge channel may be set relatively exactly and reproducibly with the aid of such a throttle.

In another embodiment, the ring filter insert may have a central tube which forms an annular chamber, which communicates with the discharge channel, radially between itself and the filter material. In this construction, the annular chamber is decoupled by the tube from a central inner chamber of the tube, through which it is possible to assign the annular chamber and the inner chamber different functions. In a refinement, the end disk equipped with the journal may particularly have a central opening which communicates with the inner chamber cited. In a correspondingly constructed filter housing, a main flow may therefore be conducted through the inner chamber of the ring filter element used as the secondary flow filter, while the secondary flow may drain through the annular chamber and the discharge channel.

Further important features and advantages of the present invention result from the subclaims, the drawing, and the associated description of the figures on the basis of the drawing.

It is obvious that the above-mentioned features and the features which will be explained in the following are usable not only in the particular combination specified, but rather also in other combinations or alone without leaving the scope of the present invention.

A fuel filter device, using which the fuel from a fuel tank is purified inside this tank, is known from DE 198 09 919 A1. This device includes a filter housing, replaceably insertable into the fuel tank, having a ring filter insert mounted therein. The entire filter housing is connected to a fuel intake line via a connecting piece shaped onto a front side of the filter housing. This housing connecting piece is not located on an end disk which is connected to the ring filter front side to form a seal, and is therefore not functionally comparable to the object of the present invention.

A preferred exemplary embodiment of the present invention is illustrated in the drawing and will be explained in greater detail in the following description, identical reference numbers identifying identical or similar or functionally identical components.

Figure 2:
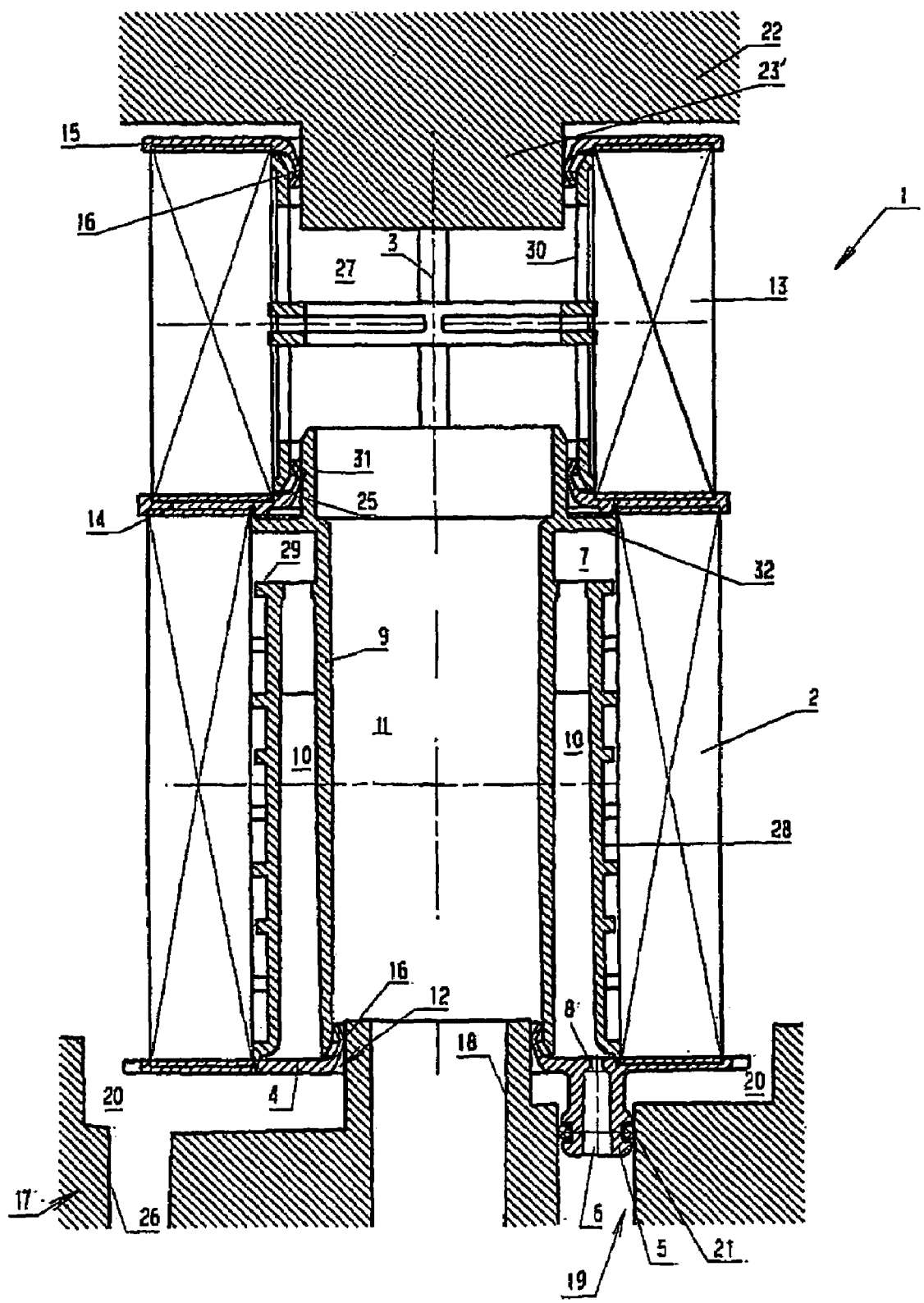

FIG. 1 schematically shows a longitudinal section through a ring filter element according to the present invention, FIG. 2 schematically shows a longitudinal section as in FIG. 1, but in a different embodiment.

As shown in FIGS. 1 and 2, a ring filter element 1 according to the present invention includes a filter material 2, which is positioned annularly and coaxially in relation to a lengthwise central axis 3 of the ring filter element 1. In this case, the filter material 2 is typically made of a paper or nonwoven folded in a star shape or pleated. Furthermore, the ring filter element 1 has at least one end disk 4, which is attached to one axial end of the filter material 2. In this case, the filter material 2 and the end disk 4 are typically connected to one another to form a seal, particularly glued or welded.

The end disk 4 has a journal 5, which projects from the end disk 4 on the side facing away from the filter material 2, positioned eccentrically to the lengthwise central axis 3. The journal 5 expediently projects axially from the end disk 4, i.e., parallel to the lengthwise central axis 3. According to the present invention, a discharge channel 6, which penetrates the journal 5 and the associated end disk 4, is integrated in the journal 5. The journal 5 is situated so that the discharge channel 6 penetrates the journal 5 and the end disk 4 radially next to the filter material 2.

In the preferred embodiment shown here, the journal 5 is positioned in such a way that the discharge channel 6 communicates with an inner chamber 7 of the ring filter element 1 that is encircled or enclosed by the filter material 2. For a filter material 2 which the liquid flows through from the radial outside to the radial inside, this inner chamber 7 corresponds to the clean side of the ring filter element 1.

The discharge channel 6 expediently penetrates the journal 5 centrally and/or axially, i.e., parallel to the lengthwise central axis 3.

In principle, the discharge channel 6 may be dimensioned in such a way that it forms a throttle as liquid flows through it. In the embodiment shown here, a throttle 8 is formed by a cross-sectional reduction in the discharge channel 6 which throttles the flow flowing through the discharge channel 6.

In the embodiment shown in FIG. 1, the ring filter insert 1 is implemented as unframed in the region of its filter material 2. In the embodiment shown in FIG. 2, the ring filter insert 1 has an inner frame 28, lying radially on the inside, on which the filter material 2 is supported radially. In the embodiment shown in FIG. 2, the inner frame 28 simultaneously forms a rising tube, so that the liquid penetrating the filter material 2 must first rise upward on the clean side along the rising tube-inner frame 28 and negotiate an overflow 29 at the upper end of the rising tube-inner frame 28 before the purified liquid may overflow into the inside of the rising tube-inner frame 28.

An inner frame which the liquid may flow through radially may also be provided in another embodiment In the preferred embodiments shown here, the ring filter element 1 contains a central tube 9, which is positioned concentrically to the lengthwise central axis 3, in the region of the filter material 2. The tube 9 is preferably positioned so that an annular chamber 10 is formed radially between the tube 9 and the filter material 2 and, in addition, the discharge channel 6 communicates with this annular chamber 10. Furthermore, the tube 9 separates the annular chamber 10 from a central inner chamber 11 of the tube 9. The end disk 4 equipped with the journal 5 additionally has a central opening 12 which communicates with the central inner chamber 11 of the tube 9.

In the embodiment shown in FIG. 2, the annular chamber 10 is implemented radially between the inner frame 28 implemented as the rising tube and the tube 9. The rising tube-inner frame 28 is attached at the end facing away from the overflow 29 to the end disk 4 equipped with the journal 5, particularly through embedding in plastic.

The tube 9 may—as in this case—be manufactured separately from the end disk 4 and connected thereto, preferably to form a seal. The tube 9 may also be manufactured in one piece and/or integrally with the end disk 4 or with another disk (see below).

The filter material 2 is expediently implemented for filtering a partial or secondary flow and is therefore referred to in the following as partial or secondary flow filter material 2. Correspondingly, the ring filter element 1 is implemented as a partial or secondary flow filter or includes such a secondary flow filter. In the embodiment shown here, the ring filter element 1 has a further filter material 13, which is implemented for filtering a main flow and/or a different partial flow. Correspondingly, the further filter material 13 is referred to in the following as the main flow filter material 13. This main flow filter material 13 is also positioned annularly and coaxially to the lengthwise central axis 3 of the ring filter element 1. In addition, the main flow filter material 13 is positioned axially neighboring the secondary flow filter material 2.

The main flow filter material 13 is also illustrated as unframed in the variation shown in FIG. 1. In contrast thereto, in the embodiment shown in FIG. 2 an inner frame 30 is provided to support the main flow filter material 13.

In the embodiments shown here, the axial ends of the two filter materials 2 and 13 facing toward one another are attached, particularly glued or welded, to a shared middle disk 14, so that this middle disk 14 separates the two filter materials 2, 13 from one another axially. The middle disk 14 is also implemented as a disk which has a central opening.

The ring filter element 2 has a further end disk 15, on the axial front side of the main flow filter element 13 facing away from the secondary flow filter material 2, which is also implemented as an end disk 15 having a central opening. The two open end disks 4, 15 are equipped radially on the inside with radial seals 16.

In the embodiment shown here, the ring filter element 1 thus forms an integral unit made of a secondary flow filter and a main flow filter. This unified ring filter element 1 may be inserted completely into a filter housing 17 (only shown partially here) and/or removed therefrom.

In another embodiment (not shown), the ring filter element 1 only contains the secondary flow filter, while the main flow filter is then formed by a separate ring filter element. In this alternative embodiment, two separate end disks are then provided instead of the middle disk 14, one of which is permanently connected to the secondary flow filter material 2 and the other of which is permanently connected to the main flow filter material 13. These end disks are expediently designed in such a way that the two separate ring filter elements are connectable to one another via these end disks. This connection is preferably detachable, particularly a clip or catch connection. The two ring filter elements may then be coupled to one another in such a way that the main flow filter and secondary flow filter are removable from the filter housing 17 together.

The ring filter element 1 according to the present invention functions as follows:

The ring filter element 1 is inserted into the filter housing 17, which is essentially vertical, from top to bottom in the direction of its lengthwise axis 3. At the same time, a central discharge connecting piece 18, which is implemented on the floor of the filter housing 17, penetrates into the central opening 12 of the leading end disk 4. The radial seal 16 of this end disk 4 comes to rest on the outside of this connecting piece 8 to form a radial seal. When the ring filter element 1 is inserted into the filter housing 17, the journal 5 additionally penetrates into an emptying channel 19, also implemented on the floor of the filter housing 17, and seals it in relation to an inlet chamber 20 of the filter housing 17. For this purpose, the journal 5 contains a radially acting seal 21.

The filter housing 17 is closable with a cover 22 (only partially shown here), a frame 33 being implemented on or attached to the cover 22 which has a central connecting piece 23 that projects into the central opening of the end disk 15 facing toward the cover 22. The radial seal 16 of this end disk 15 comes to rest on the outside of this connecting piece 23 to form a radial seal.

In the embodiment shown in FIG. 1, the end 24 of the frame 33 facing away from the cover 22 projects into the ring filter element 1 up to approximately the height of the middle disk 14. The middle disk 14 is supported radially on this end 24 of the frame 23 via a support edge 25, due to which the ring filter element 1 has increased stability in relation to the pressure differences between the dirty side and the clean side arising in operation.

In contrast, in the embodiment shown in FIG. 2, the connecting piece 23 is implemented on the cover 22. The middle disk 14 is supported via its support edge 25 on a projection 31 similar to a connecting piece, which is implemented on the tube 9. In this embodiment, the tube 9 also has a radially projecting collar 32, which extends radially up to the secondary flow filter material 2, at the transition to the projection 31. The collar 32 is also connected to the middle disk 14, particularly by being embedded in plastic. If leaks may arise between the tube 9 and the middle disk 14, through which the clean side of the main flow filter material 13 communicates with the clean side of the secondary flow filter material 2, the support edge 25 may be implemented as a radially acting seal in the embodiments of FIGS. 1 and 2.

The inlet chamber 20 of the filter housing 17 is supplied with unfiltered liquid, which rises in the inlet chamber 20 and washes around the ring filter element 1, i.e., both filter materials 2 and 13, via an inlet channel 26, also implemented in the floor of the filter housing 17. In a preferred application of the present ring filter element 1, the inlet channel 26 comes from a return line of a lubricant oil loop of an internal combustion engine, particularly of a motor vehicle. The lubricant oil penetrates the filter materials 2 and 13 radially from the outside to the inside, so that the filter materials 2, 13 each separate a radially external dirty side from a radially internal clean side. The main flow flowing through the main flow filter material 13 reaches the central inner chamber 11 of the tube 9 from the clean side of the main flow filter material 13, i.e., from an inner chamber 27 enclosed by the main flow filter material 13, and from the inner chamber reaches the discharge connecting piece 18 of the filter housing 17. The discharge connecting piece 18 thus forms the clean-side outlet of the filter housing 17, which leads to a flow line of the lubricant oil loop of the internal combustion engine in the above-mentioned preferred embodiment. While the flow through the main flow filter material 13 thus forms the main flow of the liquid to be filtered, the remaining liquid, i.e., the secondary flow, is guided through the secondary flow filter material 2. The secondary flow thus reaches the annular chamber 10 after the secondary flow filter material 2 and may exit into the emptying channel 19 therefrom via the discharge channel 6 according to the present invention. The emptying channel 19 communicates with a lubricant oil collecting container, particularly with an oil sump of the internal combustion engine, in the above-mentioned example.

The flow resistance of the discharge channel 6 may be determined through its dimensioning. In accordance with an advantageous embodiment, the discharge channel 6 is dimensioned in regard to its flow resistance in such a way that a predetermined volume flow and/or a predetermined proportion, e.g., approximately 10%, of a total flow, which is composed of the secondary flow and the main flow, results for the secondary flow. The flow resistance of the discharge channel 6 may be defined relatively exactly for a predetermined operating point via the throttle 8 in particular.

An essential advantage of the ring filter element 1 according to the present invention is also that, in the constructions shown here having integrated main and secondary flow filters in particular, it is insertable into the filter housing 17 alternately instead of a typical ring filter element, whose journal 5 does not contain the discharge channel 6, without any special provisions having to be made on the filter housing 17 for this purpose. In this way, it is possible in particular to equip a lubricant oil loop, which until now had no secondary flow filter, later and optionally with such a filter, without the filter housing 17 having to be replaced for this purpose.

The original function of the journal 5 is also maintained in the ring filter element 1 according to the present invention, because when the ring filter element is removed, the journal 5 is again removed from the emptying channel 19, so that the inlet chamber 20 may empty through the emptying channel 19, which is then open. The removal and replacement of the ring filter element 1 is thus significantly simplified. In this case, the cover 22 may expediently be coupled to the ring filter element 1 and/or to the main flow ring filter element in such a way that it is axially fixed but rotatable, so that the journal 5 may be pulled out of the emptying opening 19 when the cover 22 is removed.

In the event of stoppage of the fluid loop, i.e., when the internal combustion engine is turned off, for example, the tube 9 is used as an internal rising tube for the main flow and prevents emptying of the clean side 27 of the main flow filter material 13.

The invention claimed is:

1. A ring filter element for an oil filter for purifying lubricant oil, for an internal combustion engine of a motor vehicle,
    having an annularly positioned filter material (2),
    having at least one end disk (4), which seals the filter material on its end, and which has a journal (5), which is positioned eccentrically in relation to the lengthwise central axis (3) of the ring filter element (1) and projects outward,
    comprising a discharge channel (6), which penetrates the journal (5) and the associated end disk (4) radially next to the filter material (2),
    wherein the discharge channel (6) communicates with an inner chamber (7) of the ring filter element (1) encircled by filter material (2),
    wherein the discharge channel (6) communicates with a clean side of the ring filter element (1), and
    wherein a throttle (8) is positioned or implemented at or in an outlet end of the discharge channel (6) or upstream from the discharge channel (6).

2. The ring filter element according to claim 1,
    wherein the discharge channel (6) penetrates the journal (5) centrally.

3. The ring filter element according to claim 1, wherein the discharge channel (6) penetrates the journal (5) axially.

4. The ring filter element according to claim 1, wherein the discharge channel (6) forms or has a throttle (8).

5. The ring filter element according to claim 1, wherein the ring filter element (1) is implemented as a secondary flow filter.

6. The ring filter element according to claim 5, wherein the secondary flow filter is connectable at an end disk facing away from the journal (5) to a ring filter element implemented as a main flow filter in such a way that the secondary flow filter and main flow filter are removable from a filter housing (17) together.

7. The ring filter element according to claim 5, wherein the discharge channel (6) is dimensioned in regard to its flow resistance in such a way that a secondary flow flowing through the secondary flow filter is limited to a predetermined volume flow or to a predetermined proportion of a total flow formed by the secondary flow and a main flow.

8. The ring filter element according to claim 5, wherein the ring filter element (1) has a central tube (9), an annular chamber (10) is implemented radially between the tube (9) and the filter material (2), the discharge channel (6) communicates with the annular chamber (10).

9. The ring filter element according to claim 8, wherein the end disk (4) equipped with the journal (5) has a central opening (12), the tube (9) separates a central inner chamber (11), which communicates with the central opening (12), from the annular chamber (10).

10. The ring filter element according to claim 8, wherein the tube (9) extends from the end disk (4) equipped with the journal (5) up through the middle disk (14), the middle disk (14) has an internal radial seal (25), which is supported radially on the tube (9) to form a seal.

11. The ring filter element according to claim 1, wherein the filter material (2) is implemented for filtering a secondary flow, the ring filter element (1) has a further filter material (13), which is positioned annularly and coaxially to the lengthwise central axis (3) of the ring filter element (1) and axially neighboring the secondary flow filter material (2) and is implemented for filtering a main flow, the secondary flow filter material (2) and main flow filter material (13) have a shared middle disk (14).

12. The ring filter element according to claim 1, wherein the ring filter element (1) has an inner frame (28) on which the filter material (2) is supported radially.

* * * * *